(12) United States Patent
Haber et al.

(10) Patent No.: US 6,504,616 B1
(45) Date of Patent: Jan. 7, 2003

(54) CALIBRATED TUNABLE FIBER FABRY-PEROT FILTERS FOR OPTICAL WAVELENGTH SCANNERS AND OPTICAL SPECTRUM ANALYZERS

(75) Inventors: Todd Haber, Alpharetta, GA (US); Kevin Hsu, Roswell, GA (US); Calvin M. Miller, Naples, FL (US); Jeff W. Miller, Kennesaw, GA (US)

(73) Assignee: Micron Optics, Inc., Atlanta, GA (US)

( * ) Notice: Subject to any disclaimer, the term of this patent is extended or adjusted under 35 U.S.C. 154(b) by 59 days.

(21) Appl. No.: 09/633,362

(22) Filed: Aug. 7, 2000

Related U.S. Application Data (60) Provisional application No. 60/147,310, filed on Aug. 5, 1999.

(51) Int. Cl.[7] .................................................. G01B 9/02
(52) U.S. Cl. ........................................ 356/519; 356/480
(58) Field of Search ............................... 356/480, 519; 359/579; 250/227.19, 227.27

(56) References Cited

U.S. PATENT DOCUMENTS

| | | | |
|---|---|---|---|
| 5,073,004 A | * | 12/1991 | Clayton et al. ................ 385/27 |
| 5,838,437 A | * | 11/1998 | Miller et al. ................. 356/478 |
| 5,892,582 A | | 4/1999 | Bao et al. |
| 6,115,122 A | * | 9/2000 | Bao et al. .................... 356/450 |

FOREIGN PATENT DOCUMENTS

WO     WO98/17968     4/1998

* cited by examiner

Primary Examiner—Samuel A. Turner
Assistant Examiner—Patrick Connolly
(74) Attorney, Agent, or Firm—Greenlee, Winner and Sullivan, P.C.

(57) ABSTRACT

A method for calibrating tunable optical filters, calibrated tunable filters and devices employing such filters. The method is of particular use with fiber Fabry-Perot tunable filters and more particularly for filters which employ piezo-electric transducers as tuning elements. Sets of calibration coefficients are generated which span the wavelength region and operating temperature range of the filter. Calibrated tunable filters are combined with a means for storing the sets of calibration coefficients and means for correcting wavelength measurements using the sets of coefficients in devices which measure wavelengths of light. The sets of calibration coefficients can also be used to tune the filter to pass a selected wavelength of interest.

18 Claims, 6 Drawing Sheets

CALIBRATED TUNABLE FIBER FABRY-PEROT FILTERS FOR OPTICAL WAVELENGTH SCANNERS AND OPTICAL SPECTRUM ANALYZERS

CROSS-REFERENCE TO RELATED APPLICATIONS

This application takes priority under 35 U.S.C. 119(e) to U.S. Provisional application No. 60/147,310 filed Aug. 5, 1999, which is incorporated by reference herein to the extent that it is not inconsistent with the disclosures herein.

BACKGROUND OF THE INVENTION

This invention relates generally to devices and methods for the measurement of wavelengths of light or the detection of light at selected wavelengths.

U.S. Pat. Nos. 5,838,437 and 5,892,582 described optical wavelength scanners and spectrum analyzers which employ tunable Fiber Fabry-Perot filters (FFP-TF) for wavelength scanning. The devices and systems described in these patents incorporate a multiwavelength reference for in-situ calibration of the FFP-TF for wavelength measurement. The use of the multiwavelength reference minimizes the effects of drift and nonlinearity in the FFP-TF scanner. In a specific embodiment, the multiwavelength reference is a combination of a fixed fiber Fabry-Perot filter which provides a comb of wavelengths of known separation and a reference fiber Bragg grating (FBG) which provides a reference peak or notch to identify the wavelength of a peak in the comb. The comb of references provides reference peaks over the wavelength range of interest for detection or analysis. U.S. Pat. Nos. 5,838,437 and 5,892,582 are incorporated by reference herein in their entirety.

This invention provides improved devices for highly accurate wavelength detection which employ a pre-calibrated FFP-TF obviating the need for in situ calibration of the filter, significantly simplifying the devices which generally have fewer components and simplified hardware and software, decreasing the cost of the devices, and increasing the speed of measurement without significant loss in wavelength accuracy. The improved devices can be used in a variety of optical applications including tunable receivers, sensor interrogators, wavelength meters, optical tracking filters and optical channel analyzers. The devices of this invention generally avoid the use of optical switches needed in prior devices employing in situ calibration to allow comparison of reference and measured wavelengths. A one time calibration of the FFP-TF is performed at a range of temperatures over the intended operating temperature range of the filter to generate a set of calibration coefficients for curve fitting. These coefficients, which embody correction data for wavelength and power error, are used to correct wavelength and power measurements in devices using the FFP-TF scanner. FFP-TF can also be precalibrated for bandwidth variation. The calibration can be performed once (at multiple temperatures) after the device is constructed rather than periodically within the instrument in the field.

FFP-TF employ piezoelectric actuators or transducers (PZTs) to change the length of the FP cavity and thereby tune the wavelength of the filter. PZTs exhibit dynamic nonlinearities arising from nonlinear length dependence upon voltage, voltage hysterisis, and temperature. PZTs retain a memory, in the form of remnant polarization, of the voltage and temperature conditions to which they have been exposed. In particular, after exposure of a PZT to very low temperatures, it can take up to a month for the PZT to return to its original steady state polarization condition. Because of this sensitivity to voltage and temperature conditions, in situ calibration, as described in the U.S. patents noted above, was believed to be necessary to obtain wavelength accuracy in the 10–20 picometer range desirable for applications noted herein. The inventors have discovered that application of a low level negative voltage to the PZTs used in the FFP-TFs, rapidly resets the PZT to its original steady state condition eliminating remnant polarization due to the voltage or temperature history of the PZT. The set of calibration coefficients determined for a FFP-TF with the PZTs in this steady state condition can then be employed at any time in the future, if the PZT of the FFP-TF is reset to the steady state condition prior to making wavelength measurement and applying the pre-determined calibration coefficients.

The length of PZTs are typically changed by application of a positive variable voltage to the PZT. In a low voltage PZT, the range of voltage applied to change the length ranges from 0 to about 40 volts. An FFP-TF is typically tuned through a wavelength range by application of a voltage ramp to the PZT of the filter. Calibration of the FFP-TF associates a voltage applied to the PZT to the wavelength passed by the filter at that applied voltage.

The inventors have found that application of a low negative voltage, e.g., −5 volts to the PZT of the FFP-TF (a stacked PZT) resets the PZT to the original steady state condition eliminating remnant polarization within about 1 minute. After the PZT is reset, application of the predetermined calibration coefficients provides reproducible, accurate wavelength calibration of the filter. The negative reset voltage employed is preferably less in magnitude than about 25% of the depoling voltage (typically about 40 volts) of the PZT, i.e., less than about 10 V in magnitude. The resetting procedure has demonstrated excellent stability over a wide range of temperatures.

The devices of this invention can be programed to apply the resetting voltage to the PZTs of the FFP-TF whenever the device is turned on. Devices can also be equipped with a controller and voltage source that allows application of the negative reset voltage periodically when the device is in operation, selectively as determined by the operator of the device, or in response to an event or condition, such as the detection of a loss in wavelength accuracy or a change in operating conditions.

SUMMARY OF THE INVENTION

The invention provides a calibration method for tunable optical filters which is particularly useful with Fiber Fabry-Perot Tunable Filters (FFP-TFs) and specifically useful with FFP-TFs which employ piezoelectric transducers as tuning elements. The method is generally applicable to achieve wavelength error of less than about ±50 picometers over the operating temperatures of the filter. Preferably, application of the calibration method achieves wavelength error of less than about ±20 picometers over the operating temperature range of the filter. The invention also provides tunable optical filters calibrated by the inventive method and optical devices for measurement of wavelengths of light which comprise the inventive calibrated tunable optical filters.

The calibration method involves the determination of calibration coefficients employing a plurality of known wavelengths of light over a wavelength region of interest to generate a set of calibration coefficients.

A set of calibration coefficients is determined at each of a plurality of temperatures over the operating temperature range of the filter. The operating temperature range of the filter may, for example, range from 0° C. to about 60° C. In a preferred embodiment sets of calibration coefficients are determined at intervals of about 1° C. to about 10° C. over the operating temperature range of the device. For example, a set of calibration coefficients over the desired wavelength range spanned by the plurality of known wavelengths is determined for each interval of 1° C., 5° C. 10° C. over the operating temperature range of the filter.

The sets of calibration coefficients determined for the tunable filter which span the wavelength region of interest and the operating temperature range of interest are stored in a microprocessor or computer. The stored coefficients are then employed to correct measurements or determinations of unknown wavelengths by the tunable filter.

The stored coefficients can also be used to set the tunable filter to detect the presence of a selected wavelength among a plurality of wavelengths such as in a broad band of wavelengths.

To correct a wavelength measured by the tunable filter at a selected temperature, a set of coefficients determined at the selected temperature or within about 1° C. to about 10° C. of the selected temperature is employed. Where no set of coefficients is determined at the selected temperature, it is preferred to correct the wavelength measurement by interpolation employing two sets of coefficients measured at temperatures which bracket the selected temperature.

In a specific embodiment, the calibration method of this invention is applied to tunable filters which employ piezoelectric transducers as tuning elements. In these filters, the length of the piezoelectric transducer is changed to tune the wavelength of the filter. In a preferred application of the calibration method to such filters, a low negative voltage is applied to the piezoelectric transducer prior to determination of calibration coefficients and prior to the measurement of wavelength using the filter.

The invention also provides optical devices-for the measurement or detection of wavelengths of light or for the selection of a wavelength of light from a plurality of wavelengths of light. These devices comprise a tunable filter, preferably a fiber Fabry-Perot tunable filter, calibrated by the method of this invention. The device comprises the tunable filter and some means for storing the sets of calibration coefficients and employing the sets of calibration coefficients to correct wavelength measurements by the filter. The sets of calibration coefficients may also be used to tune the filter, e.g., by adjusting the voltage applied to a piezoelectric transducer, to receive or pass a selected wavelength.

Other aspects and benefits of the invention will become apparent on review of the following figures and detailed description.

DETAILED DESCRIPTION OF THE INVENTION

The invention is further illustrated by reference to the drawings in which the same numbers are used to refer to the same device elements.

Figure 1:
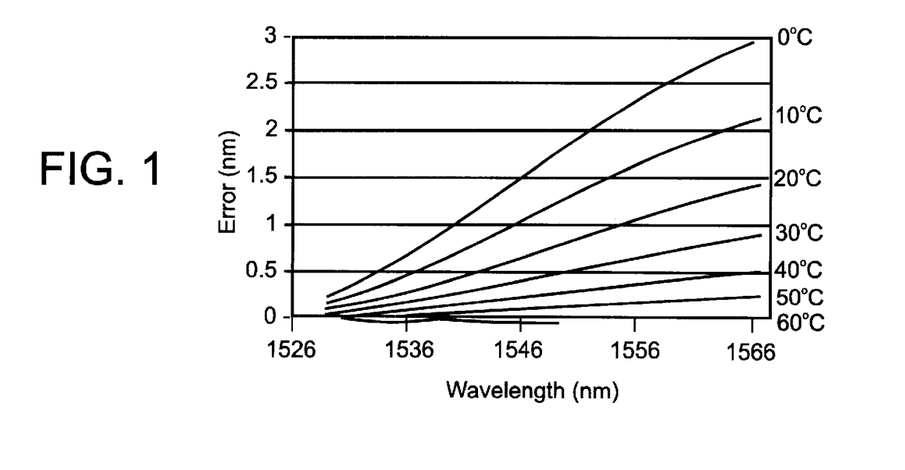
FIG. 1 is a graph of wavelength error (nm) at several temperatures as a function of wavelength (nm) when the FFP-TF calibration is performed at a single temperature (60° C.) using one known reference wavelength. Temperatures of error measurement are indicated on the graph.
Figure 2:
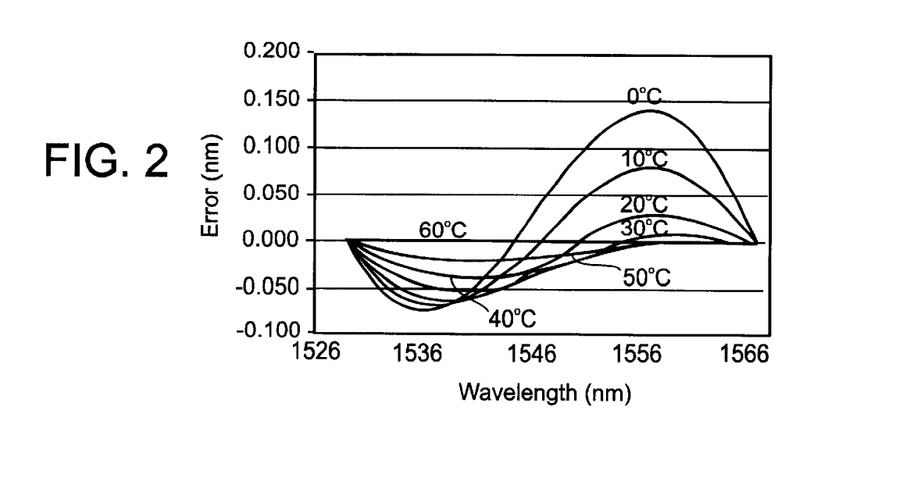
FIG. 2 is a graph of wavelength error (nm) at several temperatures as a function of wavelength (nm) when the FFP-TF calibration is performed at one temperature (60° C.) at two known reference wavelengths which bracket the wavelength range of interest. Temperatures of error measurement are indicated on the graph.
Figure 3:
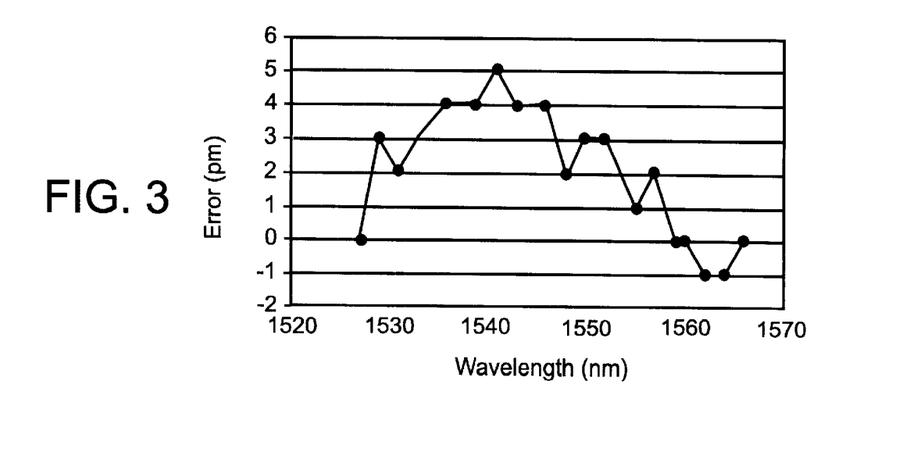
FIG. 3 is a graph illustrating wavelength error (picometers) at 25° C. using the FFP-TF calibration method of this invention. Two sets of calibration coefficients measured at 20° C. and 30° C., respectively, are applied to interpolate wavelength measurements made at 25° C.

FIGS. 1–3 are graphs illustrating the effectiveness of different calibration schemes for an FFP-TF in wavelength measurement. FIG. 1 illustrates wavelength error for measurements at varying temperatures (as indicated in the figure at 0–60° C.) when the filter is calibrated at a single temperature using one known reference wavelength (at the lower end of the operating wavelength range). The calibration was performed at 60° C. in the upper range of operating temperatures. Large errors of the order of several nanometers are observed when using this calibration procedure. This calibration method is not useful for obtaining accuracies in the 10–20 picometer range. Wavelength error is the difference between the wavelength measured by the FFP-TF as adjusted by the calibration method employed of a known reference wavelength and the actual wavelength of that known reference wavelength.

FIG. 2 illustrates the application of a similar calibration method employing two known reference wavelengths (one at the lower and one at the upper limit of the operating wavelength range to bracket the range) and a calibration performed at one temperature (60° C.). While the errors with measurements performed at different temperatures (as indicated in the graph) are significantly lower than with the calibration of FIG. 1 (of the order of hundreds of picometers) using this calibration is procedure, the errors are still too high for the intended applications.

FIG. 3 illustrates the application of interpolation using a set of calibration curves measured at temperatures over the operating range of the filter. The graph shows the errors in measurements made at 25° C. by applying interpolation of calibration coefficients measured at 20° C. and 30° C. The errors are less than about 10 picometers which is within the desired accuracy level for intended applications of wavelength scanners and spectrum analyzers.

In a specific example, an FFP-TF with PZT reset to the steady state condition is calibrated using known reference wavelengths, such as the comb of wavelengths supplied by the multiwavelength reference of U.S. Pat. Nos. 5,838,437 and 5,892,582, at a plurality of temperatures over the operating range of the filter. A variety of curve-fitting procedures can be employed to generate calibration coefficients. For example, calibration coefficients can be generated by curve-fitting of required corrections to a 6-order polynomial. Calibration curves can be measured every 1–10° C. over the operating temperature of the filter. A set of calibration curves generated every 5° C. was found to provide wavelength measurements within the desired accuracy of 10–20 picometers. Calibration coefficients are stored in the microprocessor or computer of the scanner or spectrum analyzer, e.g., in a look-up table, for correction of wavelength measurements. Since calibration is temperature dependent, the temperature of the FFP-TF at the time of wavelength measurement must be known. A temperature sensor can be used to detect the temperature and convey the measurement to the device microprocessor or computer for use in calibration. Alternatively, the FFP-TF can be maintained at a constant known temperature.

FIGS. 4A–C, 5 and 6 illustrate various device configurations which employ the pre-calibrated FFP-TF described herein.

Figure 4A:
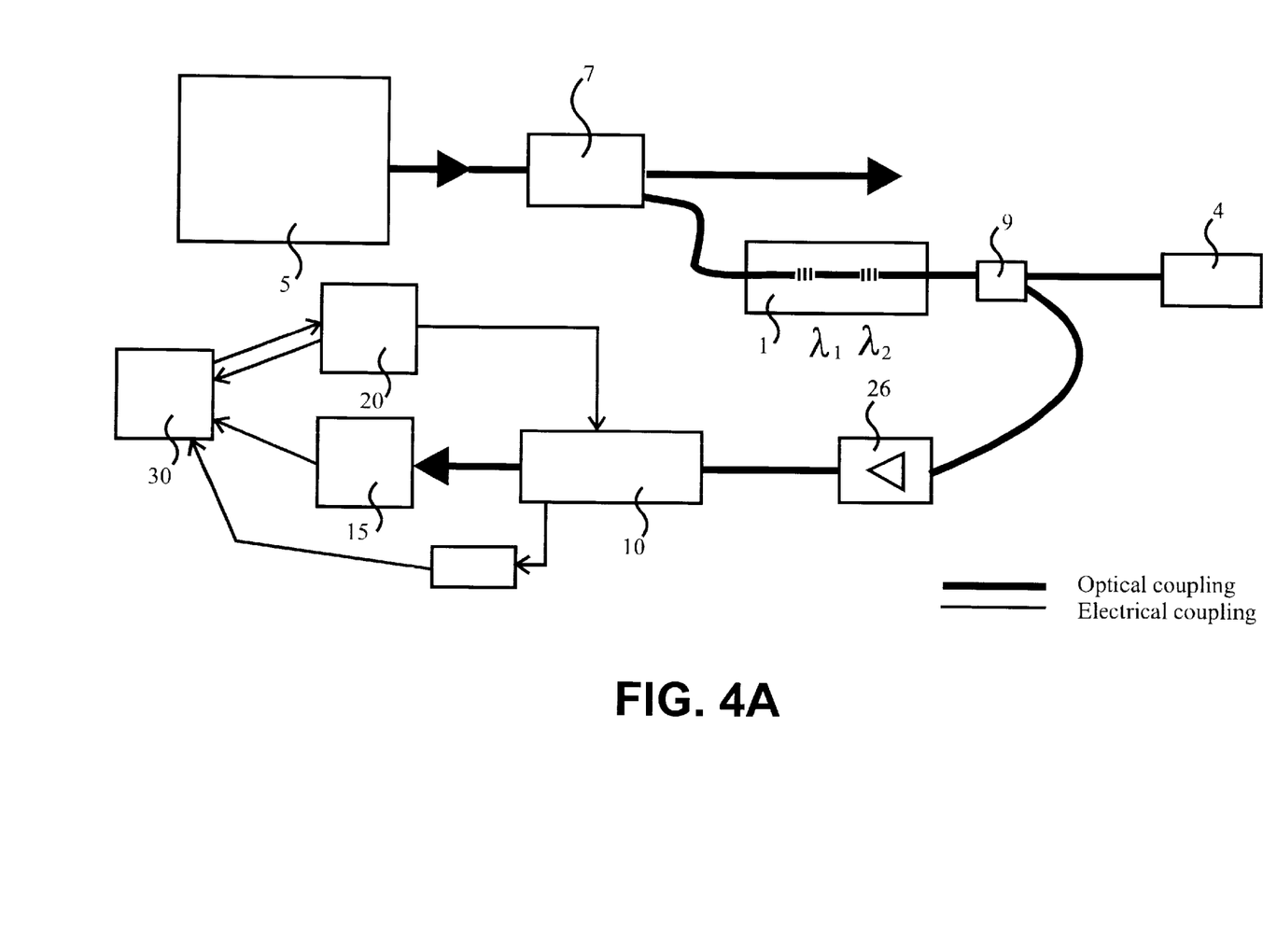
FIG. 4A is a schematic drawing of a calibrated optical channel analyzer containing a pre-calibrated FFP-TF. A set of calibration coefficients is stored in the computer or microprocessor of the device.

FIG. 4A is a schematic diagram of a calibrated optical channel analyzer where optical coupling of device elements is illustrated in heavy lines and electrical coupling with thin lines. The device contains a pre-calibrated FFP-TF and a set of calibration coefficients generated at temperatures over the operating temperature range of the device are stored in the device computer or microprocessor. Two or more known reference wavelengths bracketing or spanning the wavelength range of the device are provided. In the illustrated device, the reference wavelengths are provided using reference FBGs (1) optionally coupled to a reference light source (4).

The reference light source is optically coupled (heavy lines) through coupler 9 to the reference FBGs which reflect light back at their Bragg wavelength. The reflected FBG wavelengths pass through coupler 9 and into the calibrated FFP-TF. Subject light, (i.e., light that is being measured) from any source (5) enters the device through coupler (7) (only a small portion of the subject light need be diverted into the analyzer) and passes through coupler (9) to the FFP-TF (10). The wavelengths passed by the filter are scanned by application of a voltage ramp to the PZT (not specifically illustrated) of the FFP-TF (10). Light passing through the filter is detected by detector (15) and associated with the voltage applied to the PZT. The voltage ramp is applied through an FFP controller (FFPC) (20). A temperature sensor (25) measures the temperature of the FFP-TF and supplies this information to the computer or microprocessor (30) for use in wavelength calibration. Prior to making a measurement and preferably when the device is turned on, a negative reset voltage, preferably –5V, is applied to the PZT of the filter (10) to reset the PZT to the steady state condition. The negative reset voltage is applied through the FFPC or may be applied through a separate voltage supply. Further details of scanning the FFP-TF and data collection are provided in the U.S. patents noted above. Details of the structure of FFP-TFs are also provided in the patents noted above.

The Bragg wavelength of an FBG changes with temperature. Reference FBGs are preferably temperature controlled or temperature compensated to minimize wavelength change with temperature. Further, if the temperature dependency of wavelength of the FBG is known, it is possible to correct for temperature variation. FBG temperature correction curves are then provided to the computer or microprocessor (30). In this case, the FBG temperature is monitored with a temperature sensor and temperature information supplied to the computer or microprocessor (30) to facilitate calibration.

Subject light with two bracketing reference wavelengths ($\lambda_1$ and $\lambda_2$) enters the FFP-TF which is scanned over the wavelength range and light exiting the FFP-TF is detected as a function of applied voltage. The stored calibration coefficients of the FFP-TF appropriate for the temperature of the measurement and the measurements of the known reference wavelengths are applied to the collected data to generate calibrated wavelength measurements. This device can be used to identify the wavelengths of light in the subject light or to detect the presence of light of a selected wavelength in the subject light.

Figure 4B:
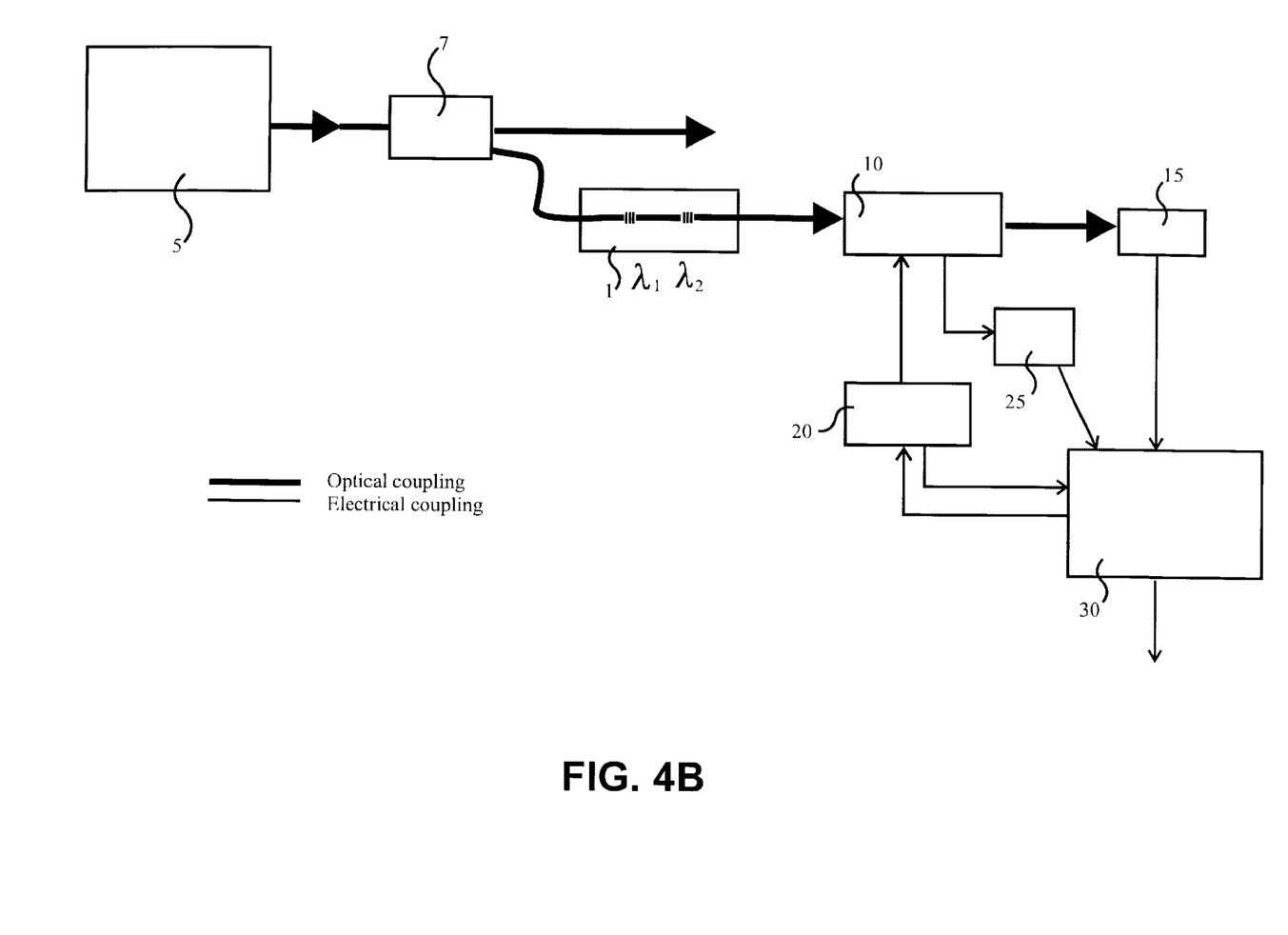
FIG. 4B is a schematic drawing of another optical channel analyzer of this invention containing a pre-calibrated FFP-TF.

FIG. 4B illustrates an alternative optical channel analyzer in which the reference FBGs (1) are optically coupled in series with the pre-calibrated FFP-TP (10). Again the computer or microprocessor (30) of the device is provided with calibration coefficients generated for the FFP-TF (10). A portion of the subject light (5) is coupled into the device through coupler (7). Subject light in this case is sufficiently broad band to encompass the FBG wavelength. Two notches in the subject light are created by passage of the light through the reference FBGs (1). Subject light with two reference notches enters the FFP-TF (10). Subject light may be a combination of light to be integrated and a broad background source extending to the reference wavelengths. The FFP-TF (10) is scanned and light is detected (at detector 15) as a function of voltage applied to the PZT of the filter. The calibration procedure is applied to the data collected to determine wavelength. As in the device of FIG. 4A, a reset voltage is provided to the PZT prior to collecting data to ensure the accuracy of application of the calibration coefficients.

Figure 4C:
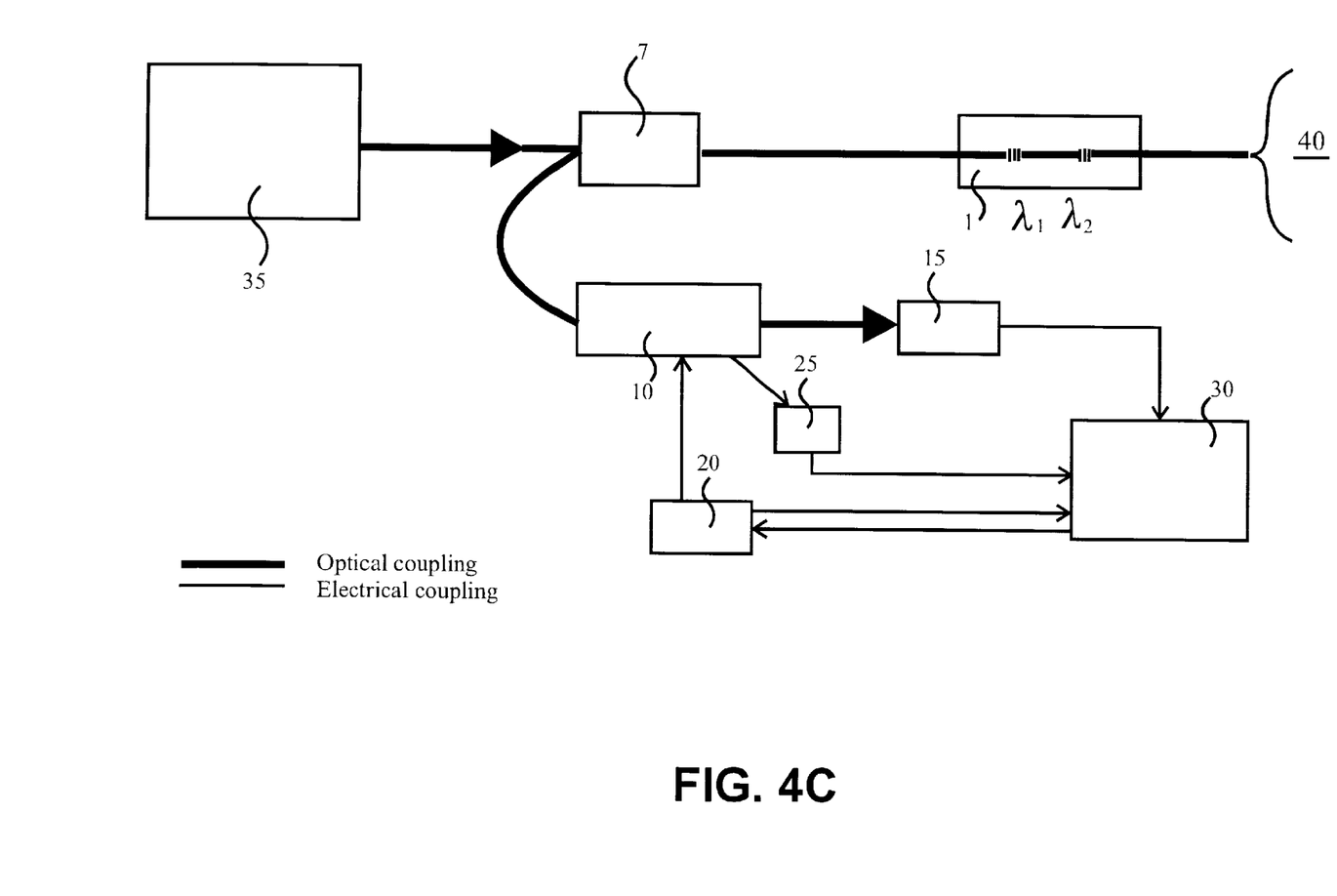
FIG. 4C is a schematic drawing of a calibrated sensor interrogator containing a pre-calibrated FFP-TF.

FIG. 4C illustrates a sensor interrogator. In this device, a sensor array (40), e.g., an FBG sensor array and two or more reference FBGs (1) are optically coupled to a light source (35) through coupler (7). Light reflected back from the reference FBGs and the sensor FBGs is coupled through coupler (7) into the FFP-TF filter (10). Resetting of the PZT, data collection and calibration is performed as in the devices of FIGS. 4A and B.

Figure 5:
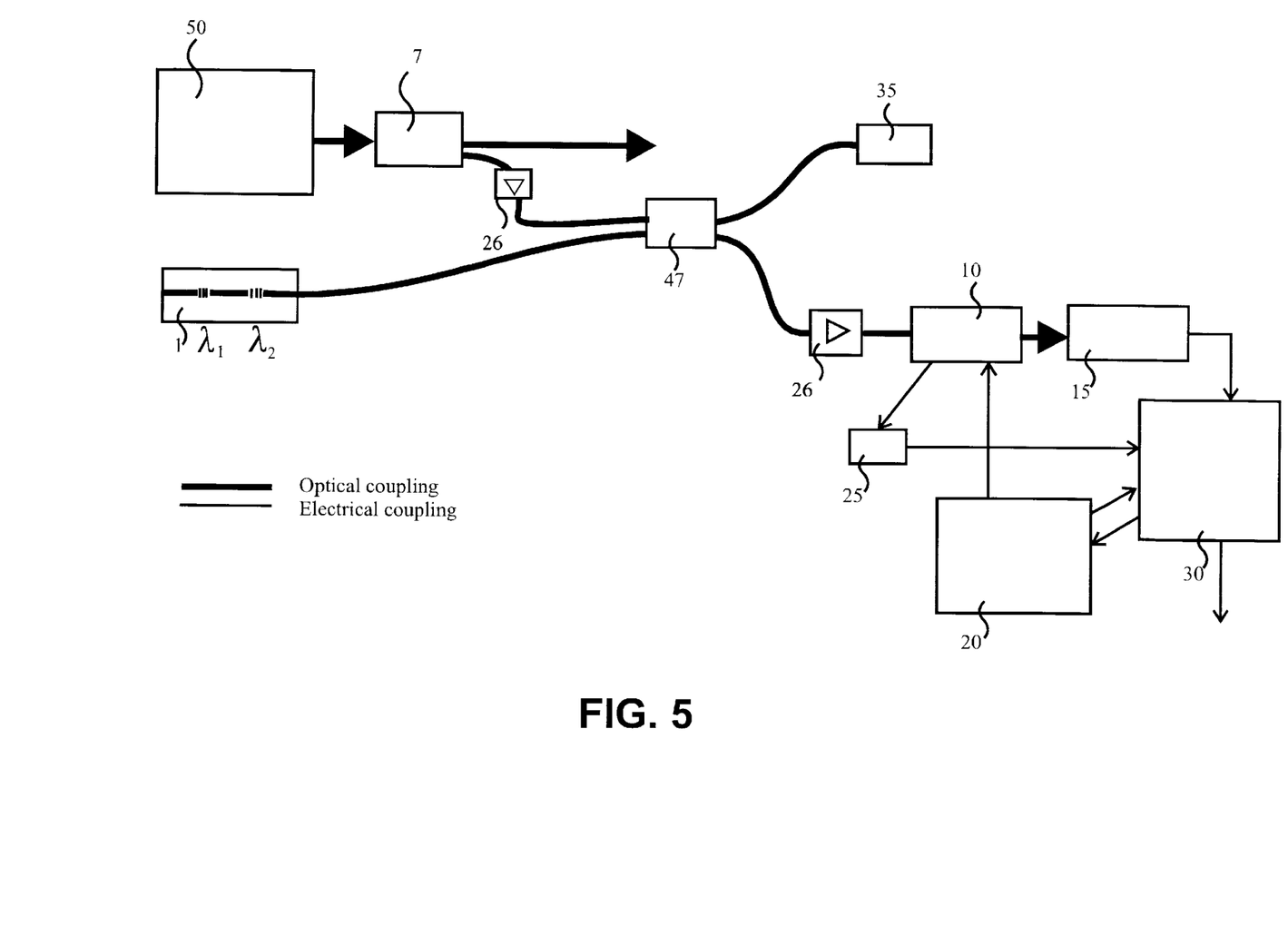
FIG. 5 is a schematic drawing of a calibrated channel monitor containing a pre-calibrated FFP-TF.

FIG. 5 illustrates a calibrated channel monitor having a pre-calibrated FFP-TF (10) of this invention. In this case WDM input (50) is coupled into the FFP-TF (10) through coupler (47). Reference wavelength peaks are generated by reflection from the FBGs which are optically coupled to a reference light source (35). The reflected reference wavelengths also enter the FFP-TF (10). Resetting of the PZT, data collection and calibration are performed as in the devices of FIGS. 4A–4B.

The device configurations of FIGS. 4A–C and 5 contain optional optical isolators (26). The FFP-TF employed in the configurations of FIGS. 4A–C and 5 are narrow BW filters. Preferred BW for these filters are in the range 30–40 picometers.

Figure 6:
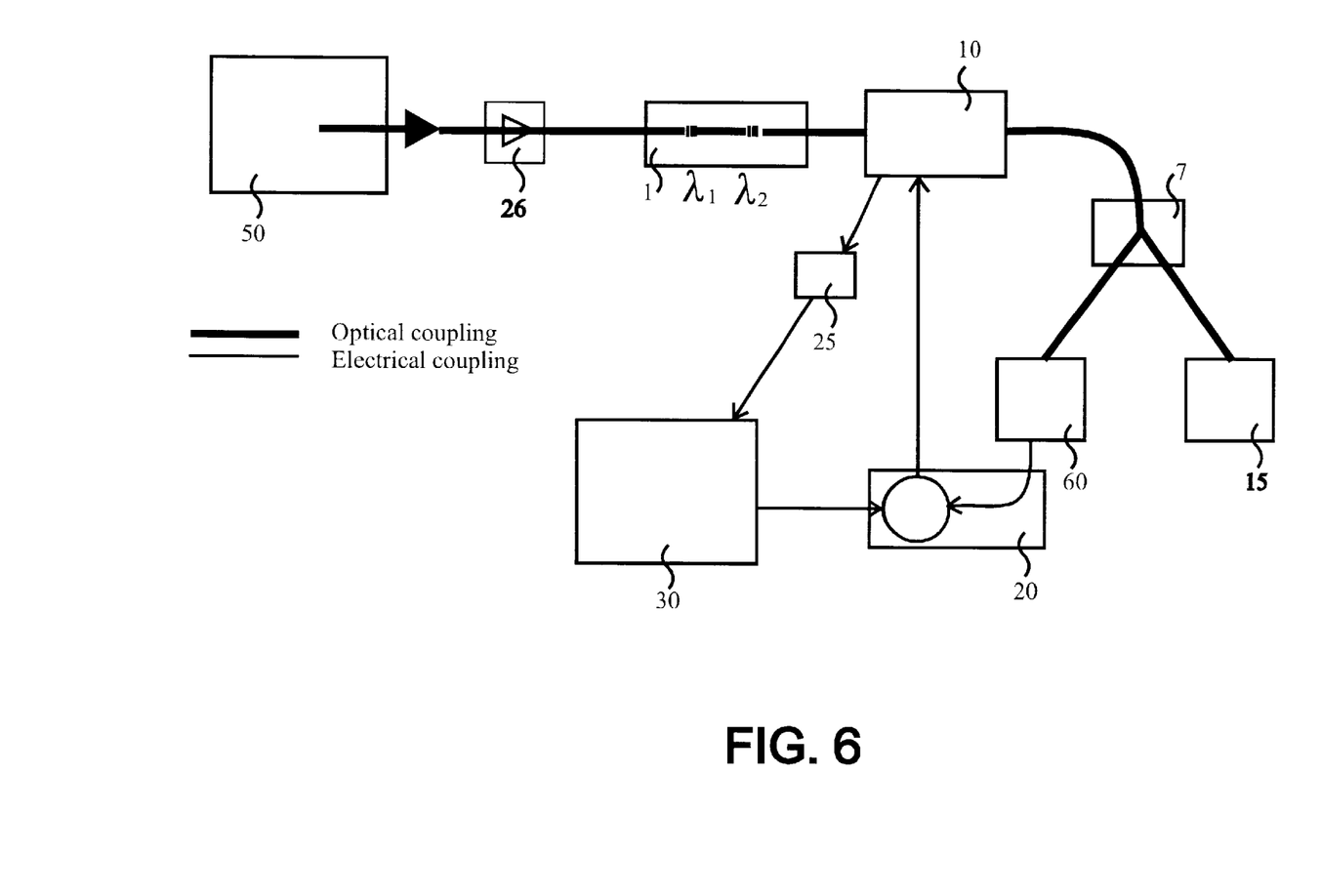
FIG. 6 is a schematic drawing of a calibrated tunable receiver containing a pre-calibrated FFP-TF.

FIG. 6 illustrates a calibrated tunable receiver. WDM input (50) passes through reference FBGs (1) generating reference wavelength notches outside of the WDM signal band, and into the FFP-TF (10). The computer generates, from a desired wavelength, the temperature, and stored calibrations coefficients, a voltage value which is applied via the FFPC (20) to the pre-calibrated FFP-TF (10). This voltage tunes the FFP-TF to approximately the desired wavelength. A small high frequency (2 KHz) AC signal is superimposed on the DC driving voltage. Approximately 90% of the signal passing through the FFP-TF is sent to the highbandwidth detector (15) as a data signal via coupler (7). The remaining 10% of the signal is diverted through a low frequency photodiode (60). The voltage output of the photodiode circuit is the input for a phase detector which produces an error signal indicating the magnitude and direction of the deviation of the FFP-TF output wavelength from the desired wavelength. This error signal is superimposed on the voltage supplied by the FFPC (20) to lock the FFP-TF output to the desired wavelength. The advantage of the wavelength-PZT voltage calibration is that the FFP-TF can be tuned within locking range of the desired wavelength by knowing only the desired wavelength and the temperature of the FFP-TF. This permits one wavelength in a signal carrying multiple wavelengths to be detected. The closed loop wavelength locking circuit extends from the FFP-TF (10) through coupler C1 (7), the phase detector (60), the FFPC (20) and back to the FFP-TF (10). The tuning circuit extends from the computer (30) through the FFPC (20) to the FFP-TF (10).

The FFP-TF used in the tunable receiver of FIG. 6 has a relatively broad bandwidth (BW) sufficient to pass the modulation on the WDM channel. Typical BW for filters for this application are 300–400 picometers.

The calibration method of this invention generates calibration coefficients employing a plurality of known wavelengths. These known wavelengths can be provided, for example, as described in U.S. Pat. Nos. 5,838,437 or 5,892,582, using a multi-wavelength reference, by providing a plurality of FBGs which reflect a plurality of known wavelengths or by providing one or more reference light sources which generate a plurality of known wavelengths. When employing certain sources of known reference wavelengths, it may be necessary to employ a bandwidth filter to isolate a selected spectral region for use as a reference.

The calibrated FFP-TF and optical devices containing them can be employed in a variety of optical applications including those noted in U.S. Pat. Nos. 5,838,437 and 5,892,582. These patents also provide descriptions of the operation and structure of FBGs and provide references describing various FFP-TF. These patents further provide detail of the operation of FFP-TF as scanners and the determination of wavelengths using such filters.

The PZT resetting procedure described herein can be employed with PZTs in any application, particularly those applications where accurate, reproducible changes in length as a function of temperature and voltage are required. This invention provides a method for calibrating all PZTs.

All references cited herein are incorporated in their entirety by reference herein to the extent not inconsistent herewith.

We claim:

1. A method for calibrating a tunable optical filter applicable over an operating temperature range of the filter which comprises the steps of:
   providing a plurality of known reference wavelengths;
   determining calibration coefficients for the tunable filter at each of the plurality of known reference wavelengths at a plurality of temperatures within the operating temperature range of the tunable filter to generate a set of calibration coefficients at each temperature;
   storing the sets of calibration coefficients in a microprocessor or computer; and
   employing the stored calibration coefficients to calibrate a wavelength measured by the filter.

2. A method for calibrating a tunable optical filter applicable over an operating temperature range of the filter which comprises:
   providing a plurality of known reference wavelengths;
   determining calibration coefficients for the tunable filter at each of the reference wavelengths at a plurality of temperatures with the operating temperature range of the tunable filter to generate a set of calibration coefficients at each temperature of the plurality of temperatures;
   employing a set of calibration coefficients determined within about 5° C. of a selected temperature to correct a wavelength measured by the tunable filter at the selected temperature; or
   employing two sets of calibration coefficients at temperatures which bracket a selected temperature to correct a wavelength measured by the tunable filter at the selected temperature.

3. The method of claim 2 wherein the tunable filter is a fiber Fabry-Perot tunable filter.

4. The method of claim 2 wherein sets of calibration coefficients are determined at about 5° C. temperature intervals over the operating temperature of the filter.

5. The method of claim 2 wherein sets of calibration coefficients are determined at about 1° C. temperature intervals over the operating temperature of the filter.

6. The method of claim 2 wherein the set of calibration coefficients employed to correct a wavelength measurement at a selected temperature is a set that was determined at a temperature within about 5° C. of the selected temperature.

7. The method of claim 6 wherein the set of calibration coefficients employed to correct a measurement is determined at a temperature within about 2° C. of the temperature of the measurement.

8. The method of claim 2 wherein the tunable filter employs a piezoelectric transducer as a tuning element.

9. The method of claim 8 further comprising the steps of applying a low negative resetting voltage to the piezoelectric transducer of the tunable filter prior to determination of the calibration coefficients and prior to any wavelength measurement of the tunable filter.

10. The method of claim 9 wherein a resetting voltage of about −5 volts is applied to the piezoelectric transducer.

11. An optical device for measuring wavelengths of light which comprises:
    a fiber Fabry-Perot tunable filter; and
    a microprocessor or computer in which sets of calibration coefficients for the tunable filter are stored wherein the stored sets of calibration coefficients comprise a set of calibration coefficients for a plurality of known reference wavelengths for each of a plurality of temperatures within the operating temperature range of the filter.

12. The optical device of claim 11 wherein the stored sets of calibration coefficients comprise a set of calibration coefficients for each 5° C. interval over the operating temperature range of the filter.

13. The optical device of claim 11 wherein the stored sets of calibration coefficients span the operating temperature range of the filter at 5° C. intervals.

14. The optical device of claim 11 wherein the fiber Fabry-Perot tunable filter comprises a piezoelectric transducer as a tuning element.

15. The optical device of claim 11 which is a calibrated optical channel analyzer.

16. The optical device of claim 11 which is a calibrated sensor interrogator.

17. The optical device of claim 11 which is a calibrated channel monitor.

18. The optical device of claim 11 which is a calibrated tunable receiver.

* * * * *